United States Patent [19]

Ross et al.

[11] Patent Number: 4,598,275

[45] Date of Patent: Jul. 1, 1986

[54] MOVEMENT MONITOR

[75] Inventors: Clive Ross, Downsview; Ralph P. Devoy, Scarborough, both of Canada

[73] Assignee: Marc Industries Incorporated, Mississauga, Canada

[21] Appl. No.: 492,669

[22] Filed: May 9, 1983

[51] Int. Cl.⁴ .............................................. G08B 23/00
[52] U.S. Cl. .................................. 340/573; 340/825.31
[58] Field of Search ............. 340/573, 825.31, 825.32, 340/825.36, 539, 521, 568, 506, 572, 825.44, 825.49, 825.54, 311.1

[56] References Cited

U.S. PATENT DOCUMENTS 3,772,668  11/1973  Smith ............................ 340/825.54
4,347,501  8/1982   Akerberg ....................... 340/506 X
4,358,756  11/1982  Morel et al. ................... 340/521 X

FOREIGN PATENT DOCUMENTS 965179  3/1975  Canada ........................... 340/825.49

Primary Examiner—James L. Rowland
Assistant Examiner—Chi K. Lau
Attorney, Agent, or Firm—George A. Rolston

[57] ABSTRACT

A proximity monitoring system for individually identifying an object or person, and having a central information processor, and a signal receiver, several remote detectors in various locations at a distance from the information processor, each having a first transmitter for communicating with such processor and having a second transmitter and a receiver, and several individual personalized portable identifiers, each identifier having a continuously activated receiver, a signal transmitter which is normally de-activated, a battery pack, and a switch operated by the receiver in response to a signal from a detector, to switch the battery on to activate the transmitter, for emitting a personalized coded identification signal.

13 Claims, 8 Drawing Figures

MOVEMENT MONITOR

The invention relates to a proximity monitoring system for detecting, and identifying an object or person in a certain location, and is of particular application in institutions such as hospitals, and large commercial establishments such as offices and the like for monitoring movement of patients and other persons at predetermined locations such as entrances and exits to buildings, or between locations in buildings, and for individually identifying the person so detected.

BACKGROUND OF THE INVENTION

Movement monitoring systems are available in which for example tags are attached to article, which tags are then detected, if the article is moved past a predetermined location. Such systems are well known as shoplifting prevention systems in stores.

However, those systems are unsuitable for use in detecting the movement and individual identity of an object or person, or for identifying that object or individual from others. In many cases, including industrial processes, luggage handling, movement of transport or rail cars, military applications, in animal care, and in institutions and large commercial organizations, it is desirable to monitor movement of units which may be inanimate objects, mobile units, animals or persons, and in particular to instantly detect the identity of such a unit when movement is detected. In the particular case of hospitals, it is desirable to monitor movement of individuals from one area to another in the building, or at entrances and exits to the building.

In these cases it is not enough simply to detect movement. It is essential to be able to detect both that movement has taken place, and it is also necessary to immediately identify the person or unit detected.

Different action may be required depending upon the identity of the person or unit detected.

For example, in the case of a hospital, it may be highly desirable to detect movement of hospital staff such as doctors, nurses and the like from one area to the other in the building, so that their location may always be known. This greatly facilitates paging of hospital staff in the case of an emergency for example. However, in the case of hospital staff it is not normally necessary to take any remedial action.

Conversely, in the case of patients in hospitals, it is necessary not only to detect movement of a patient into or out of a building or an area within a building, but it may also be necessary to immediately institute some form of remedial action such as instituting a search, or sending out hospital staff to locate the patient, and if necessary to see that the patient returns to the location where he is supposed to be. Clearly, this type of monitoring may be required in many other types of buildings and institutions, the case of the hospital simply being the most familiar example.

In the case of livestock rearing, it has been proposed, in U.S. Pat. No. 4,274,083 to provide each animal with a transmitter, receiver, battery, and antenna, and to provide a monitoring location in an agricultural building, which will then provide information concerning the individual animal.

However, in this system the transmitter, receiver, battery package which is attached to the animal is relatively massive, and the system requires that the animal transmitter and receiver shall be "on" at all times. This will, of course, result in a fairly rapid depletion of the charge in the battery, which will then mean that each individual unit must regularly be recharged in order to maintain the entire system operational.

These factors render the system unsuitable for identification of units or persons, particularly in the case of patients in hospitals. Clearly, it would be unacceptable to require each patient to wear a relatively massive structure such as that shown in the patent referred to.

However, it is well known that hospital procedure requires that each patient shall wear an identification bracelet or wrist band usually made of plastic, and in the majority of cases being disposable.

In many of the other applications referred to, identity labels or tags are used on units, which are also particularly suited to use in conjunction with the invention.

BRIEF SUMMARY OF THE INVENTION

The invention therefore generally is directed to providing a proximity monitoring system incorporating a central information storage unit, and a receiver connected thereto, a plurality of remote detector modules, adapted to be placed in various locations at a distance from the information storage unit, each having a receiver and transmitter connected thereto, and a plurality of individual personalized portable identifier units, each identifier comprising a receiver, a transmitter, and a battery pack, and switch means operated by the receiver in response to a signal from a detector module, to switch the battery through to the transmitter, and incorporating coded signal means in said transmitter for emitting a personalized coded identification signal.

More particularly, the invention seeks to provide such a system wherein the personalized portable unit is contained in a wrist band which is attachable to the person.

More particularly, the invention seeks to provide such a system in which the detector modules are programmed to emit coded monitoring signals at predetermined time intervals in sequence, to the central console, whereby to monitor the condition and operability of each detector module at predetermined time intervals.

More particularly, the invention provides such a system wherein each of the detector modules emits a coded identification signal identifying its own location, and in addition, retransmits the coded information received from the personalized portable unit, whereby the central information storage console receives a composite signal identifying the detector module, and also identifying the individual or unit located by the detector module.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments in the invention.

IN THE DRAWINGS

DESCRIPTION OF A SPECIFIC EMBODIMENT

Figure 1:
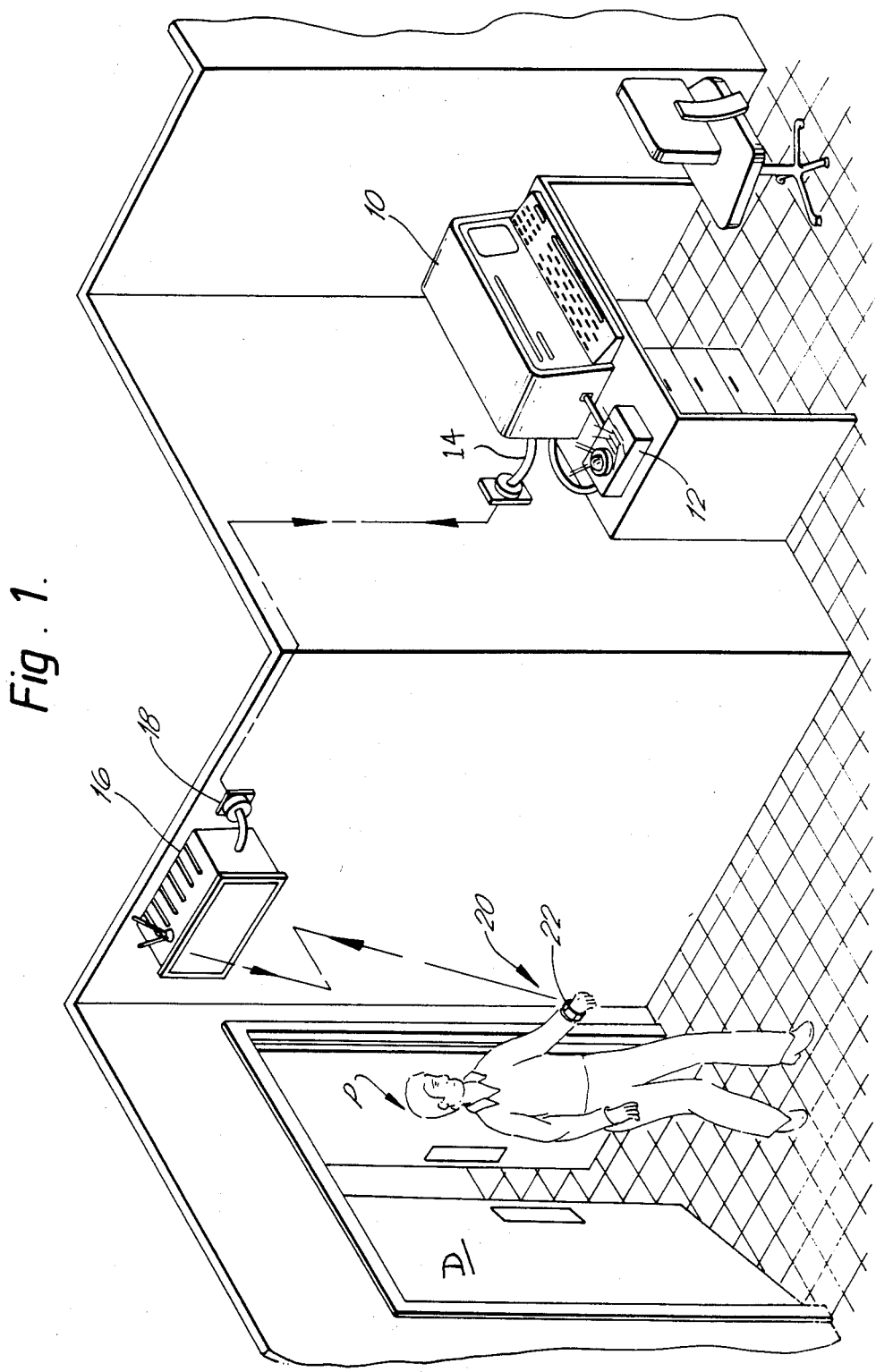
FIG. 1 is a schematic perspective illustration showing a typical application of the invention in a building.

Referring first of all to FIG. 1, the system according to the invention is shown illustrated schematically in association with a building, the details of which are omitted.

At any location which may be within the building, or at a separate security station for example, a central information storage console indicated generally as 10 is provided. The console 10 is shown at a typical work station mounted on a table, so that a supervisor may sit and watch the console twenty-four hours a day if necessary. On the other hand, such a console may function entirely automatically with a separate portable or visual warning system. Thus a warning buzzer or light is shown as 12, although of course it will be appreciated that this will not necessarily be provided, it being merely illustrated by way of example.

Typically such an information storage console will comprise a typical video display terminal with an input keyboard and a video display, and will incorporate any suitable form of information storage on electronic media.

In the case of, for example, a hospital, records of all patients and staff could be stored in electronic media in such a storage console, accessible by reference to the individual code number for that individual.

Suitable programming could be provided whereby as soon as such an individual's code number is input into the machine, the file is displayed on the screen. In a more sophisticated system it would also be possible to display a photograph of the individual if that should be necessary.

All of these capabilities are well within the scope of the art, and require no specific description.

The storage console 10 will incorporate means for receiving and processing various signals. The transmitting and receiving means will be usually hard wire connected as at 14, but may be adapted to receive and emit radio transmissions, depending upon the particular application. Thus no further disclosure is given of such transmitter and receiver beyond the general illustration of the block diagrams below.

The information storage console 10 is capable of receiving various signals and processing them and of retrieving and displaying information, and storing information as it comes in, all as will be described below.

Also illustrated in FIG. 1 is a remote detector module 16, which in this case is shown mounted at a doorway D of a building. Obviously, the mounting of such detector module 16 will depend entirely on the requirements of the end user. Some modules may be located in exit and entrance doorways to the building, and other modules may be located at entrances and exits to various areas within the building.

The detector module 16 incorporates a transmitter for transmitting a signal to the console 10 indicating the operating condition of the detector 16.

In addition, it incorporates separate transmitter and receiver circuits, monitoring identification units in its proximity as described below.

Detector 16 and Console 10 are typically hardwire connected, by wires 14 and 18.

Also illustrated in FIG. 1, is a person indicated by the letter P, wearing an identification unit 20 in a wrist band 22. The wrist band 22 is shown in more detail in FIG. 2. It comprises a conventional strap portion 24 and buckle 26. Typically, in the case of a hospital wrist band, the band portion 24 is made of sterile thermo plastic material, and is normally disposable when the patient is discharged from hospital.

Figure 3:
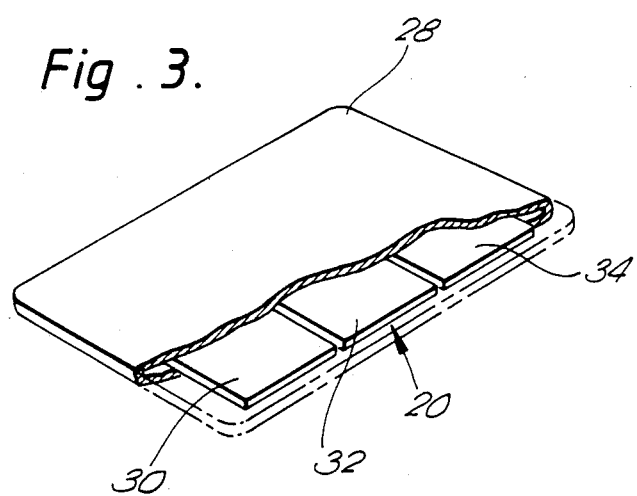
FIG. 3 is a perspective illustration of an alternate form of portable identifier.

However, in the case of more permanent usage, such as on staff, office personnel and the like in any other buildings where the wrist bands may be used for greater lengths of time, the wrist bands could be made in a more durable manner. In the typical hospital wrist band, the strap portion 24 is in the form of a flattened tube of thermo plastic, which has particular advantages to the practice of the invention as will become apparent from the following description. However, the invention is not restricted to any form of wrist band nor indeed to a wrist band per se. The identifier unit of the invention could equally well be incorporated in a lapel badge, or any other article of clothing, or a luggage tag, product label or other marking, or in a credit card, or access card 28 (FIG. 3).

Within the wrist band 22, there is provided the identifier unit indicated generally as 20. This comprises a receiver 30, a battery and switch 32, and a transmitter 34.

The receiver 30 is adapted to receive signals from any of the detector modules 16 to which it is proximate. In response to the signal the battery and switch 32 powers the transmitter 34. The transmitter 34 then emits a coded identification signal to the detector module 16.

The detector module 16 in turn transmits a two-part coded signal to the central console 10. Such signal identifies the location of the detector module 16, and the individual identification unit detected by the detector module, in its proximity.

The console 10 may display information from such a detector signal, and store it as necessary. It may also retrieve information from its memory, and display such information, in response to such a signal. An alarm may also be activated.

Figure 4:
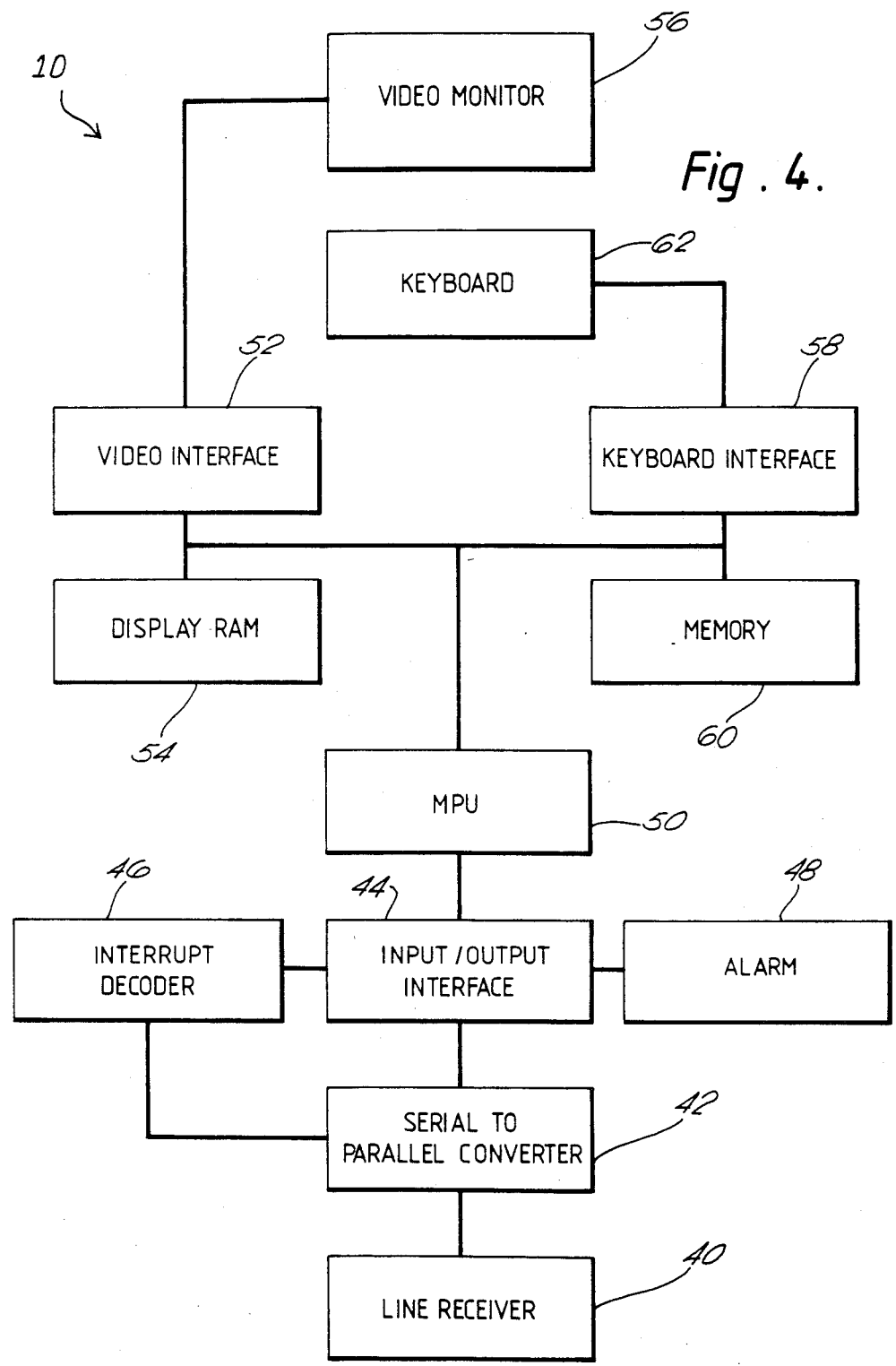
FIG. 4 is a schematic block diagram of the central information console.
Figure 5A:
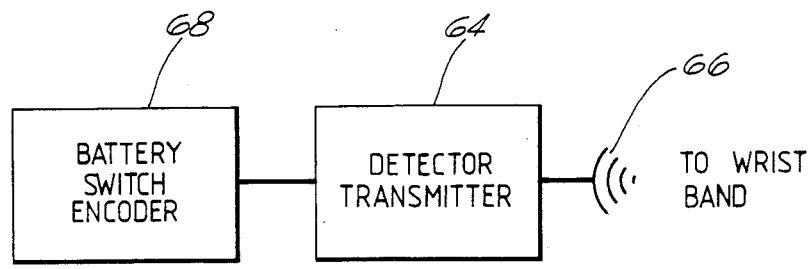
FIGS. 5a, 5b and 5c are schematic block diagrams of portions of the detector module.
Figure 5B:
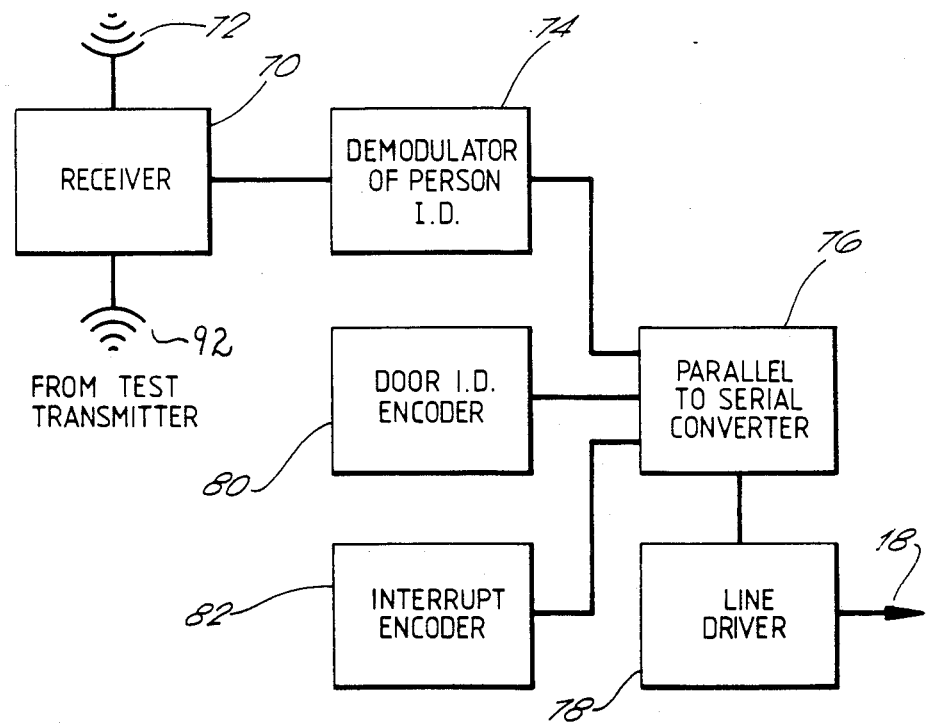
Figure 5C:
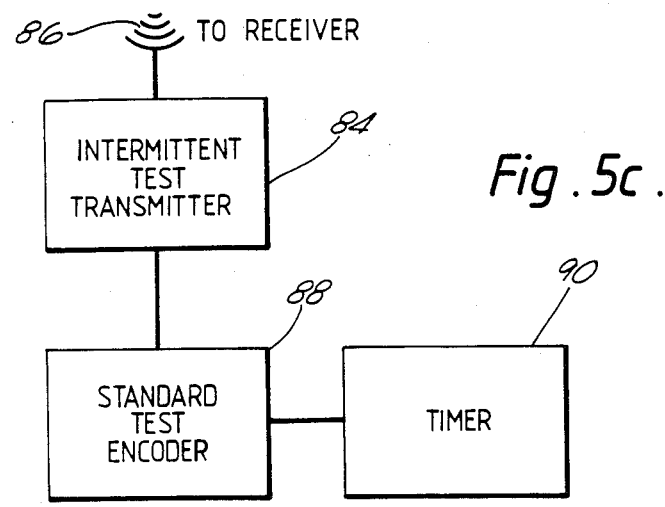
Figure 6:
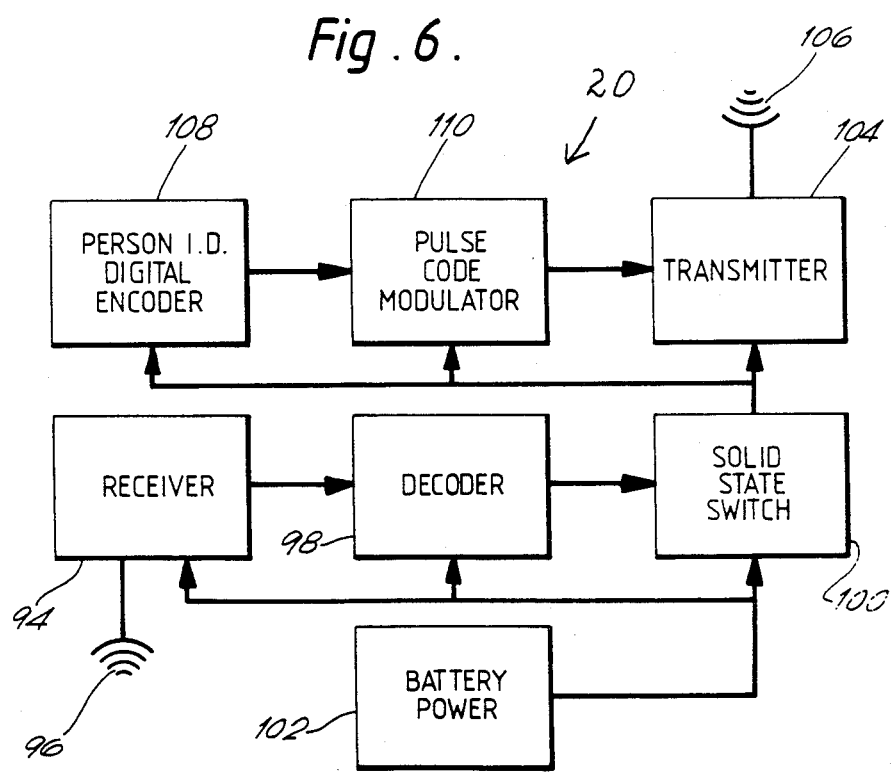
FIG. 6 is a schematic block diagram of one of the personally portable units.

FIGS. 4, 5 and 6 consist of schematic block diagrams of the central console 10, the detector module 16, and the identifier unit 20 respectively.

Referring now to FIG. 4, the central console 10 has generally the components illustrated in the various blocks in the block diagram.

Thus, it will be provided with a line receiver 40, connected to a serial to parallel converter 42, which is in turn connected directly to an input-output interface 44.

The converter 42 is also connected to an interrupt decoder 46. The interface may also be connected to an alarm 48. The precise nature of the alarm 48 will, of course, depend on the particular application, and in certain cases it may not even be required.

The sole purpose is, of course, to alert supervisory personnel to the fact that a signal has been received.

The interface 44 is in turn connected to a microprocessor (MPU) unit 50. The MPU 50 is connected to the video interface 52 and display random access memory (RAM) 54. The video interface 52 is in turn connected to a video monitor 56.

The MPU 50 is also connected to the keyboard interface 58 and keyboard memory 60, and the keyboard interface 58 is in turn connected to the keyboard 62.

Referring now to FIGS. 5A, 5B and 5C, these three illustrations show the three separate circuits contained in the detector module unit 16.

FIG. 5a, shows the detector circuit which functions to activate the identifier unit 20. This circuit comprises a detector transmitter 64, an antenna 66, and a battery switch encoder 68 connected to the detector transmitter 64.

The transmitter 64 emits a coded signal, which is transmitted through the antenna 66, and activates circuits in the identifier unit 20 in a manner to be described below. This circuit operates continuously 24 hours a day, so long as the system is in operation.

The second detector circuit is illustrated in FIG. 5b. In this circuit, a receiver 70 is provided with an identifier signal antenna 72 for receiving coded information signals from the identifier unit 20.

This receiver 70 is connected to a demodulator 74 which is in turn connected to a parallel serial converter 76, which is then connected to a line driver 78. The line driver 78 is typically connected by hard wire 18 to the console 10.

Also connected to the parallel serial converter 76 is a door identification encoder 80, and an interrupt encoder 82. The door encoder 80 provides a coded information signal identifying the location of the detector unit 16. It is referred to as a door encoder simply for the sake of convenience. It will, of course, be appreciated that such detector units may be placed in locations other than at doorways.

In this way, the signal generated by the detector unit in response to the proximity of an identifier unit 20 will contain information coded to indicate the identity of the individual identifier unit 20, and will also contain coded information identifying the particular detector unit. Thus, the signal identifies both the wearer of the wrist band, in the example shown, and also the location of the wearer.

The purpose of the interrupt encoder 82 is to provide a coded signal, which normally would precede the detector signal, and would function to inform the console that a detector signal was about to be emitted.

This would then permit the console to distinguish between detector signals, and random noise.

The detector module 16 will also incorporate a third circuit, as illustrated in FIG. 5C. The function of this circuit is to provide at periodic intervals a test signal.

Thus, the test circuit of FIG. 5c will be seen to comprise an intermittent test transmitter 84, provided with an antenna 86. A standard test encoder 88 is connected to the transmitter 84, and the encoder 88 is in turn controlled by means of a timer 90.

Signals from the antenna 86 are received at the test receiving antenna 92 connected to the receiver 70.

The test encoder 88 provides coded test information data, which is, of course, readily distinquishable in the console from the individual identification data, which would be received from an identifier unit 20.

The timer 90 functions to trigger such test signals at periodic intervals.

In this way the console will continue to receive a series of timed test signals from each detector module 16, indicating that it is functioning correctly.

The identifier unit 20 is illustrated in FIG. 6.

It will be seen to be comprised of a receiver 94, provided with a receiver antenna 96. The antenna 96 receives signals from the detector transmitter 64 via antenna 66 of FIG. 5a.

The receiver 94 is connected to a decoder 98, which is in turn connected to a switch 100.

Figure 2:
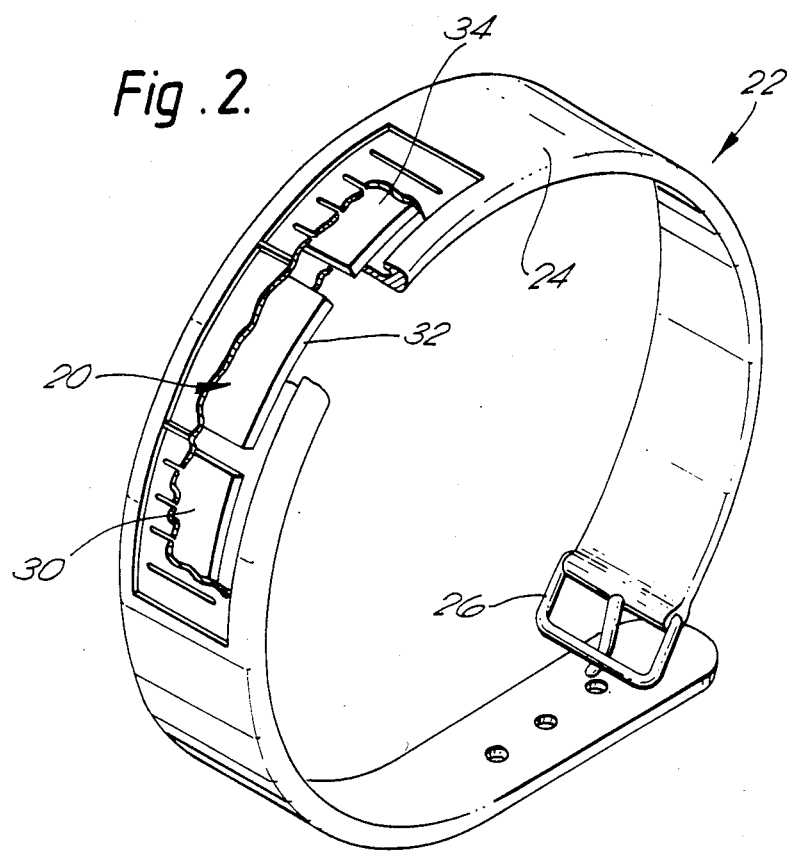
FIG. 2 is a perspective illustration showing a typical portable identifier unit in the form of a wrist band.

A miniaturized battery pack 102, corresponding to the battery 32 of FIGS. 2 and 3, is connected to the receiver 94 and decoder 98 and to the switch 100.

The nature of the receiver 94 and decoder 98 is such that they are continuously powered by the the battery pack 102, but draw only minute amounts of power. Consequently, the battery pack 102 may have an extended useful life.

The switch 100 is connected to a transmitter 104 having a transmitting antenna 106, which functions to emit identifier signals, which are received in the detector unit 16.

The transmitter 104 is connected to an individual digital encoder 108, and a pulse code modulator 110.

The transmitter 104 and the encoder 108 and modulator 110 are all normally "off". That is to say, they are not supplied with power from the battery pack 102.

However, once the receiver 94 receives a signal from anyone of the detectors, then the switch 100 is triggered to switch "on" and thus supplies power to the transmitter 104, encoder 108 and modulator 110.

The encoder and modulator then cause the transmitter to emit a personal individualized coded digital signal, which is picked up by the receiver antenna 72, and the receiver 70. By means of the circuit already described in the receiver portion of the detector, the detector then delivers a two-part signal via the line driver 78 to the central processor. As described above the two-part signal comprises a digital coded signal identifying the location of the detector and a digital coded signal received from the identifier, identifying the individual, or object, located by that detector.

When both of these signals are received in the central processing unit, various results may be programmed to occur. These results may include the sounding of an alarm, the flashing of an alarm light, the display of personnel records for that individual, and may even include the display of a stored photographic image.

Where the monitoring system is used for monitoring the movement of objects, then the central unit would be programmed in other ways, and would store different information.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A proximity monitoring system for detecting and individually identifying the proximity of any object or person from a group of objects or persons, and comprising:
   a central information processor, and processor signal receiver means connected thereto;
   a plurality of remote detector modules adapted to be placed in various locations at a distance from said central information processor, each module having a module first transmitter means for communicating with said processor signal receiver means and having a module second transmitter means operable to emit a standard, uniform "switch-on" signal for communicating with any object or person to be identified in said group, in the immediate proximity of said module, and module receiver means for receiving a signal from any object or person to be identified in the immediate proximity of said module, a plurality of individual personalized portable identifier units adapted to be associated with each said object or person in said group, each identifier unit comprising a continuously activated identifier receiver adapted to receive said uniform "switch on" signal when in the immediate proximity of any of said remote detector modules, a coded signal identifier transmitter which is normally de-activated, a battery power means, and switch means operated by the identifier receiver in response to any said uniform "switch on" signal from any said module second transmitter means of any of said remote detector modules when said identifier unit is in the immediate proximity of said module to connect said battery power means to said identifier transmitter thereby activating same for emitting a personalized coded identification signal to said module receiver means of said module; and, said module receiver means being operable, in response to a said coded identification signal, to cause said module first transmitter means to transmit a coded information signal to said processor signal receiver means, and, and said processor signal receiving means being operable, in response to said coded information signal from said module first transmitter means, to cause said central information processor to process information corresponding to said coded information signal.

2. A proximity monitoring system as claimed in claim 1 wherein the personalized portable identifier unit is contained in a wrist band which is attachable to the person.

3. A proximity monitoring system as claimed in claim 1 in which the detector modules are operable whereby said module first transmitter means emits coded condition signals at predetermined time intervals in sequence, to the processor receiver means in said central information processor, whereby to monitor the condition and operability of each detector module at predetermined time intervals.

4. A proximity monitoring system as claimed in claim 1 wherein said module first transmitter means of each detector module emits a coded identification signal identifying its own location, and in addition, retransmits said coded information received from said personalized portable unit to said processor signal receiver means, whereby said central information unit receives a composite signal identifying said detector module, and also individually identifying the object or person located by said detector module.

5. A proximity monitoring system as claimed in claim 1 wherein said personalized portable identifier unit comprises a receiver, and a decoder, said receiver being connected to said decoder which is in turn connected to said switch means, and further including battery means connected continuously to said receiver and said decoder and to said switch means, and further including a digital encoder, connected in turn to a pulse code modulator, which is in turn connected to said transmitter means, wherein said switch means is connected to said encoder and said modulator and said transmitter means, whereby the same will be activated by said battery means as soon as said switch means is switched on by said receiver and decoder.

6. A proximity monitoring system as claimed in claim 5 wherein a said remote detector module comprises a first module transmitter means having a timer, which is in turn connected to a standard test encoder, which is in turn connected to an intermittent test transmitter, which is operable to deliver a test signal to said central information processor, and further includes a battery switch encoder which is in turn connected to a detector transmitter, which is in turn connected to antenna means, for continuously emitting a "switch on" signal to the receiver of any portable identifier unit within the proximity of said detector module, and said detector module further including a receiver, which is in turn connected to an identifier unit signal demodulator, which is in turn connected to signal transmission means, and having a module I/D encoder which is in turn connected to said signal transmission means and further having interrupt encoder means which is also connected to said signal transmission means, and said receiver means in said detector module being further connected to said intermittent test transmitter within said detector module, whereby said module receiver means may receive either a signal from a portable identifier unit, or a test signal from its own intermittent test signal encoder, and will then be responsive thereto to deliver either a signal containing the module I/D, and the identity of the portable identifier unit in its proximity, or the module I/D and its intermittent test signal, through said signal transmission means to said central information processor.

7. A detector module for use in association with a proximity monitoring system for detecting and individually identifying the proximity of any object or person of a group of objects or persons, of the type wherein a central information processor contains information concerning said detector module, and said group of objects or persons, and wherein said object or person is identified by an individually personally portable identifier unit, said remote detector module comprising:

module first transmitter means operable for communicating with said central information processor;

module second transmitter means operable to emit a standard uniform "switch on" signal to communicate with all personally portable identifier units in the immediate proximity of said module, and, module receiver means operable to receive coded information signals from said personally portable identifier unit, for retransmission by said module first transmitter means to said central information processor.

8. A remote detector module as claimed in claim 7 including modular coded information signal means operable at predetermined time intervals, said module first transmitter means being operable to transmit said coded condition signals at said predetermined time intervals to said central information processor whereby to monitor the condition and operability of said detector module at predetermined time intervals.

9. A remote detector module as claimed in claim 7 including module coded identification signal means operable to deliver a module identification signal, said module first transmitter means being operable in response to receipt of a coded information signal from a said personally portable identifier unit, to transmit to said central information processor a coded identification signal identifying the location of that module, and said coded identification signal received from said personally portable identifier unit.

10. A personally portable individual identifier unit, for use in a proximity monitoring system for detecting and individually identifying the proximity of an object or person, said system having a plurality of remote detector modules, at spaced locations, adapted to communicate with said individual identifier units, and a central information processor, storing information regarding said remote detector modules, and said individual portable identifier units, said individual portable identifier unit comprising:

a continuously activated identifier receiver adapted to receive a standard uniform "switch on" signal from any said remote detector module, when in the immediate proximity thereof;

a coded signal identifier transmitter which is normally deactivated;

battery power means;

switch means connected with said battery power means, and operated by said identifier receiver in response to a said standard uniform "switch on" signal from a said remote detector unit to switch said battery means from off to on, whereby to activate said identifier transmitter, said identifier transmitter thereupon emitting a personalized coded identification signal to said remote detector module for retransmission to said central information processor.

11. A personally portable individual identifier unit, as claimed in claim 10 wherein said unit is contained in a wrist band which is attachable to the person.

12. A personally portable individual identifier unit wherein said unit is contained in an access card.

13. a personally portable individual identifier unit, which comprises a receiver, a decoder, said receiver being connected to said decoder, said switch means being connected to said decoder, battery power means connected continuously to said receiver and said decoder and said switch means, digital encoder means connected in turn to a pulse modulator, and which is in turn connected to said transmitter means, said switch means being connected to said encoder means and said modulalator and said transmitter means, whereby the same will be activated by said battery power means, as soon as said switch means is switched from off to on by said receiver and said decoder.

* * * * *